(12) United States Patent
Davies et al.

(10) Patent No.: US 6,646,993 B1
(45) Date of Patent: Nov. 11, 2003

(54) COMMUNICATION APPARATUS AND METHOD OF FORMAT ADAPTATION THEREFOR

(75) Inventors: Robert Ivor Davies, Swindon (GB); Graham Ronald Johnson, Marlborough (GB)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/440,874

(22) Filed: Nov. 16, 1999

(30) Foreign Application Priority Data

Apr. 12, 1999 (GB) .............................. 9908134

(51) Int. Cl.[7] .............................................. H04J 13/00
(52) U.S. Cl. ...................... 370/252; 370/342; 370/465; 370/522
(58) Field of Search ................................ 370/320, 342, 370/252, 522, 465

(56) References Cited

U.S. PATENT DOCUMENTS

| | | | | |
|---|---|---|---|---|
| 5,099,517 A | * | 3/1992 | Gupta et al. .................. | 380/29 |
| 5,241,539 A | * | 8/1993 | Obermeier ................... | 370/465 |
| 5,289,476 A | | 2/1994 | Johnson et al. | |
| 5,606,576 A | | 2/1997 | Dapper et al. | |
| 5,940,438 A | * | 8/1999 | Poon et al. .................. | 375/222 |
| 6,282,174 B1 | * | 8/2001 | Abe ............................ | 370/252 |

FOREIGN PATENT DOCUMENTS

GB          233016 A          7/1999

* cited by examiner

*Primary Examiner*—Min Jung

(57) ABSTRACT

This invention relates to a communication apparatus (203) and method of format adaptation particularly suited for a CDMA cellular communication system. A transmitter (211) transmits a signal to a communication apparatus (203) using a specific transmission format. The transmission includes transmission format information allowing the receiver (217) to adapt to the current transmission format. A hybrid scheme is adopted where transmit format information needed for symbol information is generally transmitted in a transmission block prior to the one where it is applied whereas transmit format information relevant to processing of the demodulated symbols is transmitted in the same transmission block to which it applies. The communication apparatus (203) thus comprise adjustment means (223) operable to adjust a characteristic of the current or future transmission blocks in response to the received transmission format information. The invention is applicable to the UMTS mobile cellular communication system.

8 Claims, 1 Drawing Sheet

COMMUNICATION APPARATUS AND METHOD OF FORMAT ADAPTATION THEREFOR

FIELD OF THE INVENTION

This invention relates to a communication apparatus and method of format adaptation therefor, and in particular for use in a CDMA cellular communication system for mobile communication.

BACKGROUND OF THE INVENTION

In a cellular communication system each of the subscriber units (typically mobile stations) communicates with typically a fixed base station. Communication from the subscriber unit to the base station is known as uplink and communication from the base station to the subscriber unit is known as downlink. The total coverage area of the system is divided into a number of separate cells, each predominantly covered by a single base station. The cells are typically geographically distinct with an overlapping coverage area with neighbouring cells. FIG. 1 illustrates a cellular communication system 100. In the system, a base station 101 communicates with a number of subscriber units 103 over radio channels 105. In the cellular system, the base station 101 covers users within a certain geographical area 107, whereas other geographical areas 109, 111 are covered by other base stations 113, 115.

As a subscriber unit moves from the coverage area of one cell to the coverage area of another cell, the communication link will change from being between the subscriber unit and the base station of the first cell, to being between the subscriber unit and the base station of the second cell. This is known as a handover. Specifically, some cells may lie completely within the coverage of other larger cells.

All base stations are interconnected by a fixed network. This fixed network comprises communication lines, switches, interfaces to other communication networks and various controllers required for operating the network. A call from a subscriber unit is routed through the fixed network to the destination specific for this call. If the call is between two subscriber units of the same communication system the call will be routed through the fixed network to the base station of the cell in which the other subscriber unit currently is. A connection is thus established between the two serving cells through the fixed network. Alternatively, if the call is between a subscriber unit and a telephone connected to the Public Switched Telephone Network (PSTN) the call is routed from the serving base station to the interface between the cellular mobile communication system and the PSTN. It is then routed from the interface to the telephone by the PSTN.

A cellular mobile communication system is allocated a frequency spectrum for the radio communication between the subscriber units and the base stations. This spectrum must be shared between all subscriber units simultaneously using the system.

One method of sharing this spectrum is by a technique known as Code Division Multiple Access (CDMA). In a Direct Sequence CDMA (DS-CDMA) communication system, the signals are prior to being transmitted multiplied by a high rate code whereby the signal is spread over a larger frequency spectrum. A narrowband signal is thus spread and transmitted as a wideband signal. At the receiver the original narrowband signal is regenerated by multiplication of the received signal with the same code. A signal spread by use of a different code will at the receiver not be de-spread but will remain a wide band signal. In the receiver the majority of interference caused by interfering signals received in the same frequency spectrum as the wanted signal can thus be removed by filtering. Consequently a plurality of subscriber units can be accommodated in the same wideband spectrum by allocating different codes for different subscriber units. Codes are chosen to minimise the interference caused between subscriber units typically by choosing orthogonal codes when possible. A further description of CDMA communication systems can be found in 'Spread Spectrum CDMA Systems for Wireless Communications', Glisic & Vucetic, Artech house Publishers, 1997, ISBN 0-89006-858-5. Examples of CDMA cellular communication systems are IS 95 standardised in North America and the Universal Mobile Telecommunication System (UMTS) currently under standardisation in Europe.

Future cellular communication systems such as UMTS will support many different applications and services. In order to provide these services efficiently, a number of different transmission formats will be supported. Examples of different transmission formats includes different spreading rates, modulation formats, forward error correcting codes and interleaving formats. The receiver must take the current transmission format into account and in UMTS, it is intended that information on the transmission format will be embedded in the communication. Specifically, it is intended that control bits (known as TFCI bits) will be included to signal the transmission format to the receiving units. On a block by block (frame by frame basis) the transmitter sets the TFCI bits to indicate the format used to encode the user data. The received TFCI is used in the receiver to perform the appropriate decoding of the user data. The types of parameter, which may be affected by the TFCI include: the spreading factor or modulation, the channel coding, rate matching, interleaving and service multiplexing. In UMTS the TCFI bits together with pilot and other information is transmitted on one quadrature channel while the user data is transmitted simultaneously on the other quadrature channel.

However, current schemes have a number of disadvantages. One of these is that using the TFCI bits to indicate the transmission format in the subsequent frame causes an inherent delay which for UMTS is 10 msec, which is unacceptable for some services. However, using the TFCI bits to indicate the transmission format in the current frame requires that the TFCI bits are demodulated and decoded before the demodulation of the user data can commence. This can result in a significant increase in the complexity of the receiver as the raw signal samples must be stored. For example, in UMTS the TCFI bits are spread throughout a frame and the decoding of these bits cannot be completed until the end part of the frame. As a result a receiver must store a whole frame of signal samples at least at the chip rate rather than storing symbol samples. As the spreading factor can be up to 256 times or higher, this results in significantly increased storage requirements.

SUMMARY OF THE INVENTION

The inventors of the current invention have realised that conventional approaches for performing transmission format adaptation has a number of disadvantages including having inherent delays and/or requiring very complex receivers. The invention seeks to provide advantages including reducing delays for a number of transmission format adaptations while not requiring significant increase in the complexity of receivers.

Accordingly there is provided a communication apparatus comprising receiving means for receiving transmissions from a transmitter, the transmissions comprising transmission format information; and adjustment means for adjusting at least one characteristic of the communication apparatus in response to the received transmission format information; wherein the at least one characteristic is adjusted for the transmission block in which the transmission format information was received when the received transmission format information belongs to a first subset of transmission format information and for at least one subsequent transmission block when the received transmission format information belongs to a second subset of transmission format information.

Preferably the first subset comprise transmission format information relevant to symbol level processing and the second subset comprises transmission format information relevant to chip level processing. Specifically, the first subset may comprise transmission format information chosen from the group of a channel coding; an interleaving format; a transmission rate; and a multiplexing of services; and the second subset may comprise transmission format information chosen from the group of a spreading factor; a spreading modulation; a spreading code; and a modulation format. According to a feature of the invention the communication apparatus is used in a cellular CDMA communication system.

According to a different feature of the invention, the transmission format information is communicated as transmission format data and a mapping between the transmission format data and a transmission format parameter is dynamically determined.

According to a second aspect of the invention, there is provided a communication system comprising transmission means for transmitting a signal comprising transmission format information; receiving means for receiving the signal transmitted from the transmission means; and adjustment means for adjusting at least one characteristic of the receiving means in response to the received transmission format information wherein the at least one characteristic is adjusted for the transmission block in which the transmission format information was received when the received transmission format information belongs to a first subset of transmission format information, and for at least one subsequent transmission block when the received transmission format information belongs to a second subset of transmission format information.

According to a third aspect of the invention there is provided a method of format adaptation in communication system comprising the steps of: transmitting a signal comprising transmission format information; receiving the signal transmitted from the transmission means; and adjusting at least one characteristic of the receiving means in response to the received transmission format information wherein the at least one characteristic is adjusted for the transmission block in which the transmission format information was received when the received transmission format information belongs to a first subset of transmission format information, and for subsequent transmission blocks when the received transmission format information belongs to a second subset of transmission format information.

The invention thus provides an improvement in the transmission format adaptation and specifically it provides reduced delay for many transmission format adaptations while not requiring significantly increased complexity of the receivers.

BRIEF DESCRIPTION OF THE DRAWINGS

An embodiment of the present invention is described below, by way of example only, with reference to the Drawings, in which.

DETAILED DESCRIPTION OF A PREFERRED EMBODIMENT

The following description focuses on an embodiment compliant with the current approach for the standardisation of UMTS but it will be apparent that the invention is not limited to this application.

Figure 1:
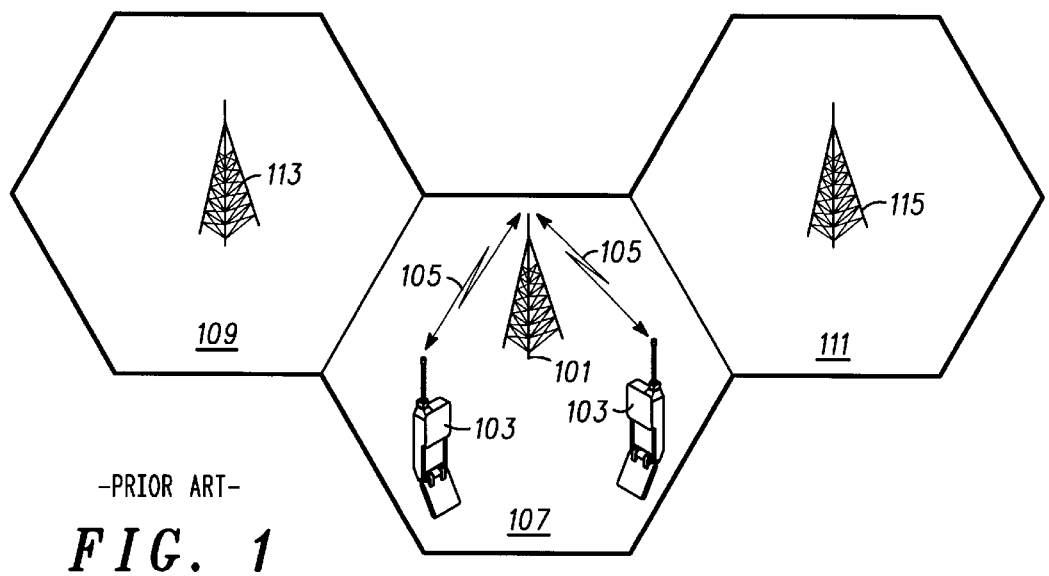
FIG. 1 is an illustration of a cellular communication system according to prior art.
Figure 2:
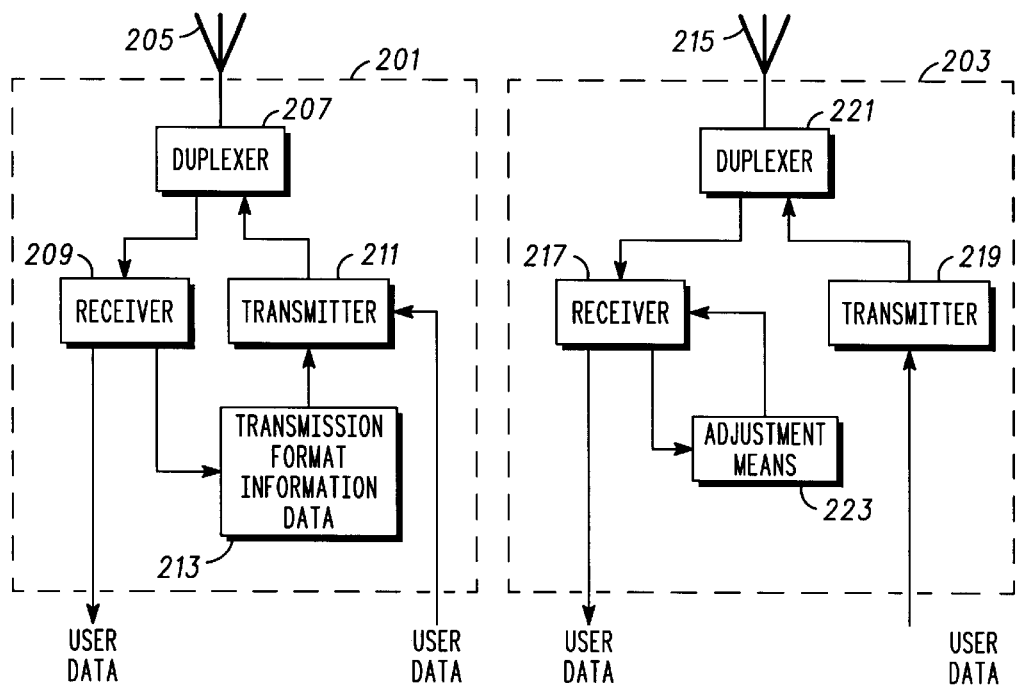
FIG. 2 is an illustration of a UMTS base station and subscriber unit in accordance with an embodiment of the current invention.

FIG. 2 illustrates a communication system in accordance with the current invention. A first communication apparatus consists in a UMTS base station 201, which is in communication with a second communication apparatus consisting of a subscriber unit 203. The base station comprises an antenna 205 connected to a duplexer 207 which feeds the received signal to a base station receiver 209 and feeds the transmit signal from a base station transmitter 211 to the antenna 205. The base station 201 also comprise means 213 for generating transmission format data relating to the transmission format used for the transmissions to the subscriber unit 203.

The subscriber unit 203 comprises an antenna 215, which connects to a receiver 217 and a transmitter 219 through a duplexer 221. The receiver 217 is connected to adjustment means 223 operable to modify a characteristic of the subscriber unit 203, which in the shown example is a characteristic of the receiver 217.

In operation the base station 201 communicates with the subscriber unit 203 transmitting and receiving user data. In addition the means 213 for generating transmission format data generate transmission format information which is transmitted to the subscriber unit. This transmission format information relates to parameters of the transmission format employed for the transmission, such as the modulation scheme or forward error correcting scheme used.

The subscriber unit 203 communicates with the base station 201 and transmits and receives user data. The nature of the user data will depend on the actual application and service supported and can be for example short data messages or a speech data supporting a conventional speech call. In addition, the receiver 217 of the subscriber unit 203 is operable to receive the control data containing the transmission data information. The control data is fed to the adjustment means 223, which in return changes a characteristic of the subscriber unit 203. In the example embodiment, a characteristic of the receiver 217 of the subscriber unit 203 is adjusted to allow reception of the signal transmitted from the base station 201. For example, if the transmission format information indicates that a QPSK (Quaternary Phase Shift Keying) modulation scheme is used for the transmission the characteristics of the receiver 217 will be set to receive a QPSK signal. If however the transmission format information indicates that a FSK (Frequency Shift Keying) signal is transmitted the receiver 217 characteristics will be set for the receiver 217 to receive an FSK signal.

The transmission format information is embedded with the user data and the same transmission format will typically be used for a transmission block. UMTS employs a frame structure resulting in transmission blocks of 10 msec duration. The same transmission format is thus employed for a 10 msec duration. However, the inventors of the current invention have realised that if the transmission format information is embedded in the transmission block to which it applies, the receiver will have no prior information as what transmission format is used. It will therefore need to consider all possible transmission formats, which may be used in order to decode the transmission data information. This will result in very complex receivers. However, if the transmission format information in one transmission data block relates to the transmission in one or more subsequent transmission blocks, a significant delay between deciding on and using a specific transmission format is incurred. This will result in sub-optimal performance of the communication link.

Therefore, in accordance with the current embodiment the subscriber unit and base station have designated a first and second subset of transmission format information. If the received transmission format information belongs to the first subset it will apply to the transmission block in which it was received, and if it belongs to the second subset it will relate to the transmission format of the following transmission block. In the specific embodiment, the first subset will include the parameters, which do not affect the demodulation of the data symbols whereas the second subset includes the parameters, which do affect the demodulation of the data symbols. As a consequence, transmission format changes, which have an impact on how the channel data symbols are determined will be known in advance to receiving the corresponding transmission block, whereas transmission format changes, which operate on the demodulated data symbols will be communicated in the transmission block to which they apply. As a result the storage requirements of the receiver is reduced to being storage of the demodulated data symbols.

In the example of a CDMA communication system, a receiver not having information of the used spreading rate will need to demodulate the symbols by trying all the possible spreading rates or codes, or alternatively buffering the chip data or performing a two stage decoding. This increases the complexity of the receiver. However, if the spreading rate and code is known the receiver can demodulate the data symbols as for a conventional CDMA receiver not performing transmission format adaptation. It can then use this information for the further processing of the demodulated symbol, e.g. it can perform the interleaving of the data symbols in accordance with the received transmit format information. Accordingly, in this example the spreading rate and code will belong to the second subset whereas the interleaving information will belong to the first subset. A CDMA receiver storing data at the chip level (i.e. at least one sample per chip) is significantly more resource demanding than one storing data at the symbol level (i.e. one or few samples per symbol). Hence, the first subset will preferably comprise transmit format information which relate to processing of samples at the symbol level whereas the second subset comprise transmit format information related to processing at the chip level.

As a result of the described transport format adaptation approach the delay performance is thus reduced for transport format changes which do not affect the demodulation of the transmit format information whilst not imposing significant additional complexity on the receiver.

Examples of parameters, which are suited for inclusion in the first subset are:

a) a channel coding.

The forward error correcting scheme employed typically operates on the demodulated symbols and therefore is preferably included in the first subset.

b) an interleaving format.

Similarly, the data interleaving scheme employed will be operating on demodulated symbols and will preferably be included in the first subset.

c) a transmission rate.

The transmitted data rate can be changed for example the symbol repetition or puncturing of error correcting codes can be changed. Another example is for a speech call using discontinuous transmission where the data rate is high during speech but low during pauses in the speech.

(d) a multiplexing of services.

A connection may support a plurality of services such as for example voice and packet data, and these services are thus multiplexed together. Depending on the characteristics of each of the services, the multiplexing may change from block to block. The changes in service multiplexing can affect both parameters relevant to chip level and to symbol level processing and this characteristic can thus depending on the application be considered for both the first and the second subset.

Examples of parameters, which are suited for inclusion in the second subset are a) a spreading factor.

The spreading factor or spreading ratio or rate is required by a CDMA receiver in order to demodulate the symbol data. It is therefore preferably included in the second subset.

b) a spreading modulation.

The spreading of the CDMA signal can be performed using different modulation scheme such as QPSK or GMSK (Gaussian Minimum Shift keying). This information is used by the receiver when demodulating symbol data and is therefore preferably included in the second subset c) a spreading code.

The specific spreading code uses for the specific communication in a CDMA communication is used by the receiver to demodulate the signals. It is thus preferably included in the second subset.

d) a modulation format.

The modulation scheme used for a transmission is used by the receiver when demodulating symbol data and this information is preferably included in the second subset. Examples of modulation schemes include QPSK and GMSK.

It will be apparent that the invention is not limited to an embodiment with a continuous transmission scheme with only changes in transmission format being communicated. It is thus equally applicable to an embodiment where packet data transmission is used and wherein the transmission format is communicated by including transmit format information in the data packets. In this example a transmission block can correspond to a data packet and the transmit format information of the first subset relates to the transmission format of the current data packet whereas transmit format information belonging to the second subset relates to the transmission format of the next packet to be communicated.

The transmit format information transmitted can be a complete set of parameters relevant to the transmission format or can be a subset of the parameters. Specifically, the transmit format information can simply consist of information of any changes, which are introduced to the transmission format.

It will also be apparent that the adaptation can be performed in the base station, in the subscriber unit or in both. The adaptation can be independent in the uplink and downlink direction or can be interrelated.

According to one embodiment of the invention the transmission format information is transmitted using transmission format data where the transmission format data is mapped to different parameters of the transmission format.

This mapping may be pre-determined for a given communication system or may be determined dynamically as appropriate. Specifically, the mapping of transmit format data to the transmit data information can dynamically be determined at call set-up. In this case there is no universal mapping but the mapping is determined for each new call by negotiation between the subscriber unit and the base station. As an example, a call may be set up for a high speed data services and in this case a given transmission format data bit may be determined to denote that a 16-QAM (Quadrature Amplitude Modulation) modulation is used when set, and QPSK is used when not set. However, another call may be set up for providing a speech service. In this case the same transmission format data bit may be used to indicate that full rate speech coding is used when the bit is set and that half rate speech coding is used when the bit is reset. Alternatively the mapping can be altered at regular intervals or at specific events such as a call hand over.

What we claim is:

1. A communication apparatus comprising
   receiving means for receiving transmissions from a transmitter, the transmissions comprising transmission format information;
   adjustment means for adjusting at least one characteristic of the communication apparatus in response to the received transmission format information; and
   wherein the at least one characteristic is adjusted for processing a transmission block the transmission block being a first transmission block, in which the transmission format information was received when the received transmission format information belongs to a first subset of transmission format information and the transmission block being a subsequent transmission block when the received transmission format information belongs to a second subset of transmission format information.

2. A communication apparatus as claimed in claim 1 wherein the first subset comprise transmission format information chosen from the group of
   a) a channel coding;
   b) an interleaving format;
   c) a transmission rate; and
   d) a multiplexing of services.

3. A communication apparatus as claimed in claim 1 wherein the second subset comprise transmission format information chosen from the group of
   a) a spreading factor;
   b) a spreading modulation
   c) a spreading code;
   d) a modulation format; and
   e) a multiplexing of services.

4. A cellular CDMA communication system incorporating the communication apparatus of claim 1.

5. A communication apparatus as claimed in any of claims 1–4, wherein the first subset comprise transmission format information relevant to symbol level processing and the second subset comprises transmission format information relevant to chip level processing.

6. A cellular CDMA communication system as claimed in claim 4 wherein the transmitter comprises means for dynamically designating the transmission format information belonging to the first and second subset of transmission format information.

7. A communication apparatus according to claim 1 further comprising transmission means for transmitting a signal comprising transmission format information.

8. A method of format adaptation in communication system comprising a receiving means and a transmitting means, the method comprising the steps of:
   transmitting a signal comprising transmission format information;
   receiving the signal transmitted from the transmission means; and
   adjusting at least one characteristic of the receiving means in response to the received transmission format information;
   wherein the at least one characteristic is adjusted for processing a transmission block, the transmission block being a first transmission block in which the transmission format information was received when the received transmission format information belongs to a first subset of transmission format information, and the transmission block being a subsequent transmission blocks when the received transmission format information belongs to a second subset of transmission format information.

* * * * *